No. 718,854. PATENTED JAN. 20, 1903.
D. W. MILLER.
EXCAVATING MACHINE.
APPLICATION FILED OCT. 6, 1902.
NO MODEL. 5 SHEETS—SHEET 1.
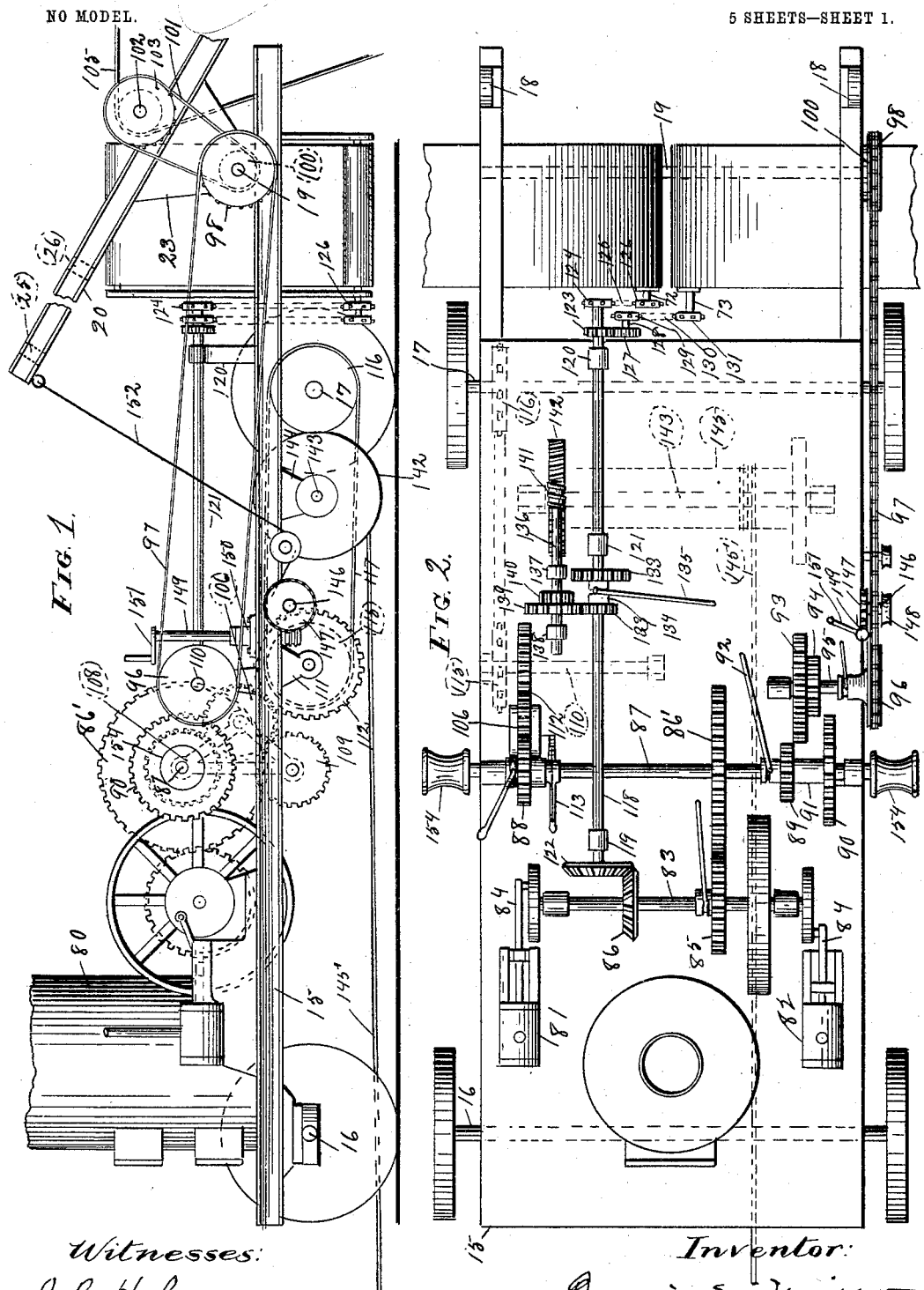
Witnesses:
J. B. Halpenny
A. Haddon Smith
Inventor:
David W. Miller
By Offield Towle & Linthicum
Attys.

No. 718,854. PATENTED JAN. 20, 1903.
D. W. MILLER.
EXCAVATING MACHINE.
APPLICATION FILED OCT. 6, 1902.
NO MODEL. 5 SHEETS—SHEET 2.
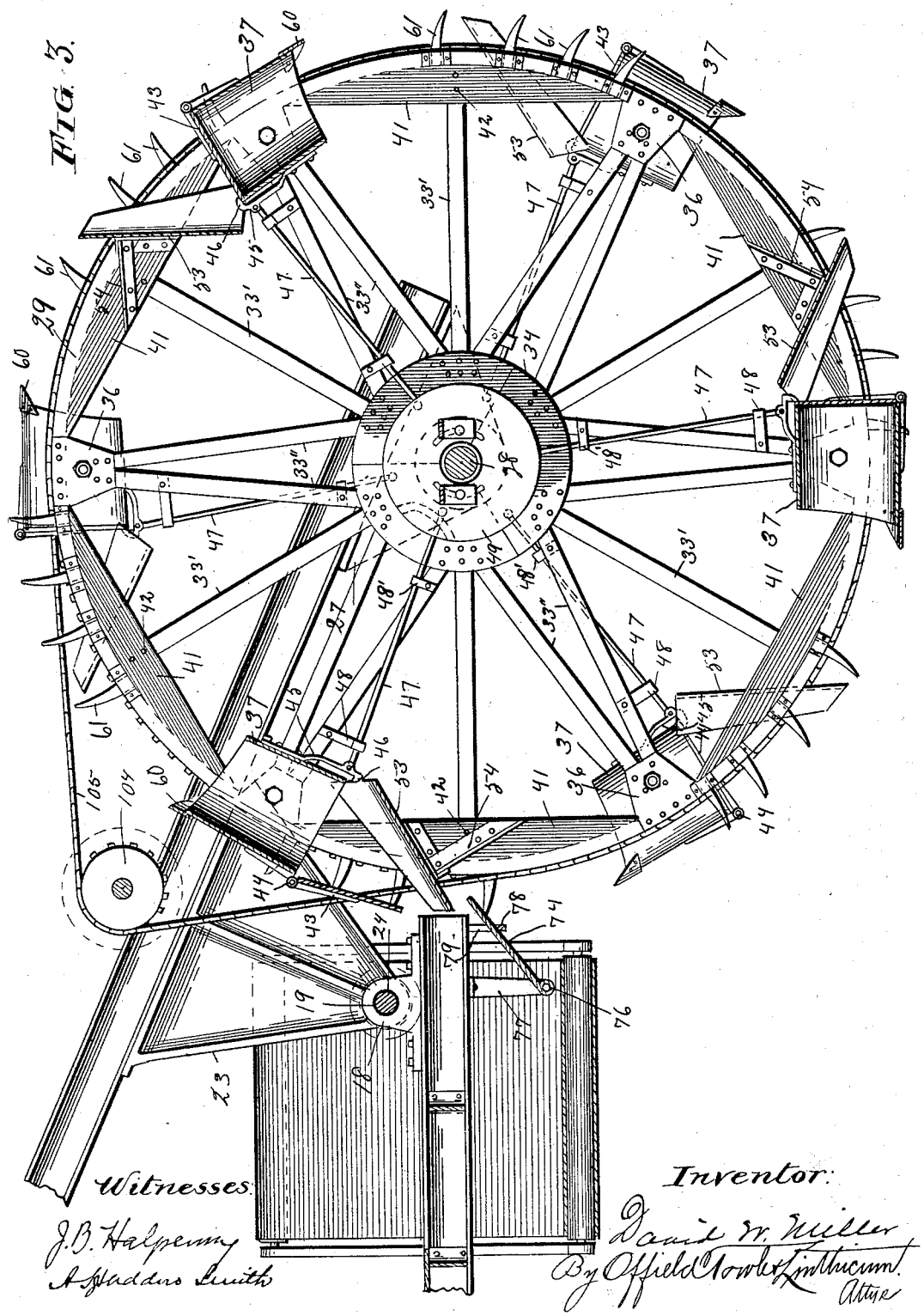

No. 718,854.　　　　　　　　　　　　　　　　　PATENTED JAN. 20, 1903.
D. W. MILLER.
EXCAVATING MACHINE.
APPLICATION FILED OCT. 6, 1902.
NO MODEL.　　　　　　　　　　　　　　　　　　　　　5 SHEETS—SHEET 3.
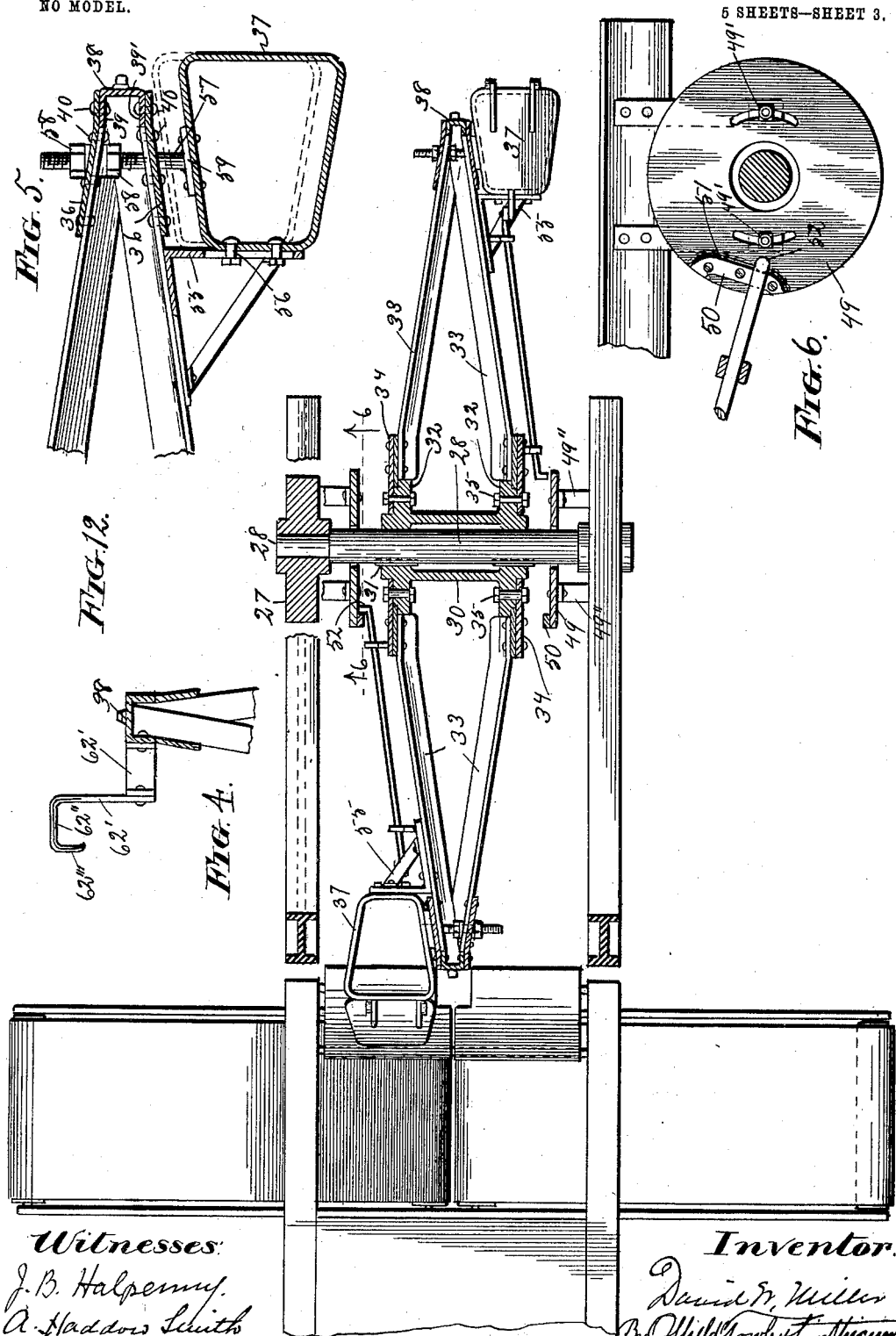
Witnesses:　　　　　　　　　　　　　　　　　　　　　　Inventor:

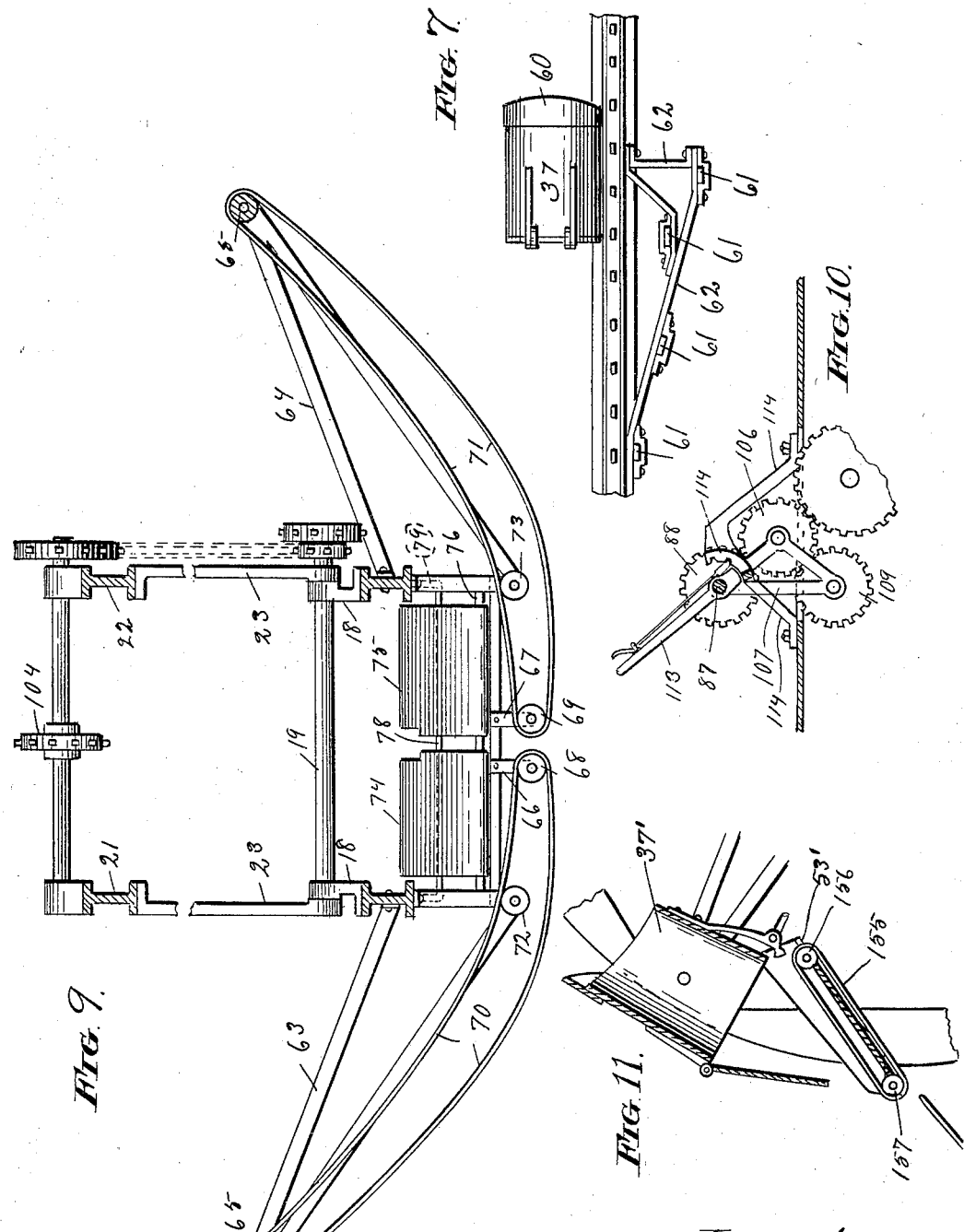

No. 718,854. PATENTED JAN. 20, 1903.
D. W. MILLER.
EXCAVATING MACHINE.
APPLICATION FILED OCT. 6, 1902.
NO MODEL. 5 SHEETS—SHEET 5.
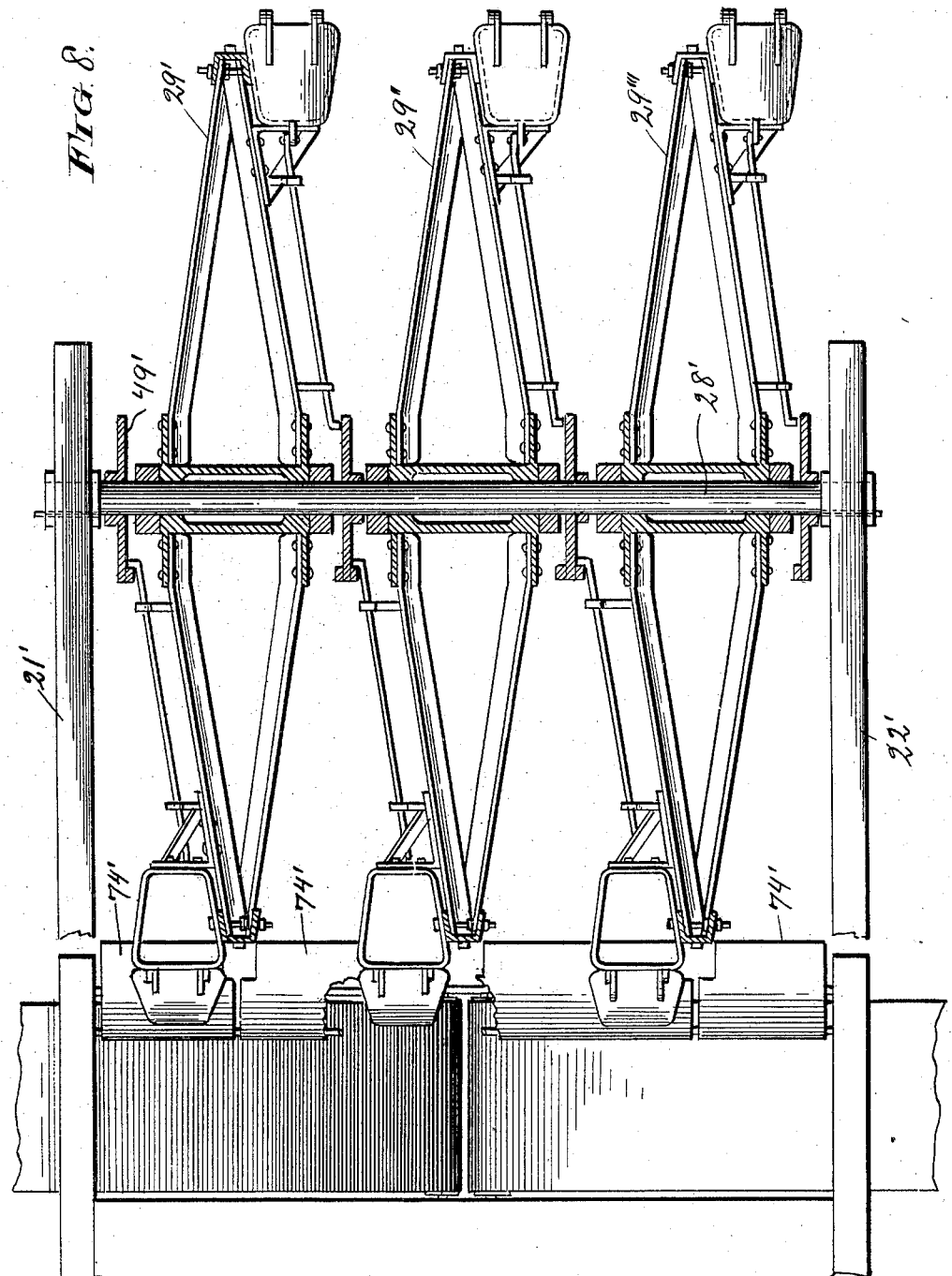

UNITED STATES PATENT OFFICE.

DAVID W. MILLER, OF CHICAGO, ILLINOIS.

EXCAVATING-MACHINE.

SPECIFICATION forming part of Letters Patent No. 718,854, dated January 20, 1903.

Application filed October 6, 1902. Serial No. 126,128. (No model.)

*To all whom it may concern:*

Be it known that I, DAVID W. MILLER, a resident of Chicago, in the county of Cook and State of Illinois, have invented certain new and useful Improvements in Excavating-Machines, of which the following is a specification.

This invention relates to improvements in excavating-machines, and refers more specifically to that type adapted for ditching and analogous purposes.

Among the salient objects of the invention are to provide a machine by means of which a ditch or analogous excavation can be made by a continuous operation, means being provided for advancing the machine and performing the excavating operation simultaneously; to provide in a machine of the character referred to a construction in which a series of excavating scoops or buckets fixedly mounted upon an excavating-wheel are successively filled and caused to discharge at a predetermined point automatically; to provide improved means for receiving and conveying the excavated material to either side of the path of progress of the machine, the said conveying operation being also performed continuously; to provide a construction wherein the mechanism is carried and supported by a wheeled frame or truck and in which the excavating-wheel is so mounted or supported from said truck as to be capable of manipulation to raise or lower the same bodily, and thus to vary the depth of excavation; to provide improvements in the details of construction and arrangement of the excavating-wheel whereby a wheel is produced of maximum strength and minimum weight and in which the parts which are subjected to the greatest working stress are fixed parts of the wheel structure; to provide improvements in the mechanism whereby the transfer of the excavated material from the scoops or buckets to the conveyers is rendered more effective and certain in operation and clogging obviated; to provide a machine which may be increased in capacity by simply adding a number of additional wheels or excavator units, so as to vary the width of the ditch to be excavated without substantially reconstructing the machine; to provide a construction in which the width of cut of a single wheel may be considerably varied by adjustment of the position of the excavating-scoops upon the wheel; to provide a construction in which a series of diggers or stirrers operate in advance of each scoop, thus relieving the latter from excessive strain; to provide improvements in the power and power-transmission devices whereby the machine supplies its own traction power and is capable of being driven both forwardly and backwardly as a whole by means of the same power plant which normally actuates the excavating wheel or wheels; to provide in a mechanism of the character last referred to means for varying the speed whereby an exceedingly powerful and relatively slow movement may be produced or a more rapid and less powerful movement, at will, and in general to provide improvements in the details of construction and arrangement in a machine of the character referred to.

To these ends the invention consists in the matters hereinafter described, and more particularly pointed out in the appended claims; and the invention will be more readily understood from the following description by reference to the accompanying drawings, forming a part thereof, in which—

Figure 1 is a side elevation of a preferred embodiment of the machine, showing the principal parts of the latter, except the excavating-wheel at the rear and the upper portion of the boiler, which parts are broken away to reduce the size of the figure. Fig. 2 is a plan view of the parts shown in Fig. 1. Fig. 3 is a detail, principally in side elevation, but with parts in vertical section, of the preferred embodiment of the excavating-wheel forming a part of the machine shown in Figs. 1 and 2. Fig. 4 is a view, partly in plan and partly in horizontal axial section, of the parts shown in Fig. 3. Figs. 5, 6, and 7 are fragmentary details of the excavating-wheel shown in Figs. 3 and 4. Fig. 8 is a view similar to Fig. 4, but showing an embodiment of the invention in which a plurality of excavating-wheels are arranged side by side in the same frame and upon the same main shaft. Fig. 9 is a transverse vertical sectional view taken immediately in rear of the conveyer-belts and between the latter and their rear supporting-brackets, showing, however, the guides 74 and 75 in elevation, the tilting frame being shown in section, taken in a plane perpendicular to its main side members and just in rear of the brackets 23 thereof. Fig. 10 is a detail of the traction-reversing mechanism. Fig. 11 is a fragmentary detail in section of a slightly-modified construction, showing particularly the arrangement of conveyer-belts upon the guide-aprons. Fig. 12 is a detail showing the construction and mounting of one of the diggers upon the excavating-wheel.

Describing said machine in detail, 15 designates as a whole a wheeled truck-frame, which may be of any suitable construction and is supported upon wheeled front and back axles 16 and 17. Upon the rear end of the wheeled truck-frame 15 is mounted a pair of journal-bearings 18 in transverse alinement with each other and supporting a shaft 19, upon the opposite ends of which are mounted the two main beam members 21 and 22 of a tilting frame, (designated as a whole 20.) Each beam member 21 and 22 is provided midway of its length upon its under side with a supporting casting or bracket 23, provided at its lower angle with a journal-aperture 24, which fits upon the main shaft 19, and the beam members are united and made rigid with each other by means of a suitable cross frame structure extending between the upper or forward end portions of the beams, as indicated in dotted lines at 25 and 26. Upon the rear or lower end of each beam 21 and 22 is mounted a journal bearing or bracket 27, within which bracket is journaled the main shaft 28 of the excavating-wheel, (designated as a whole 29.) A suitable winch is provided for oscillating the tilting frame 20 as a whole upon its pivotal axis formed by the transverse shaft 19, whereby the excavating-wheel is raised or lowered bodily to the required position.

Describing now in detail the construction of the excavating-wheel as embodied in the preferred construction shown in the drawings, 30 designates the hub member of the wheel, which is in the form of a tubular casting splined or otherwise rigidly mounted upon the main shaft 28, as indicated at 31, and provided at each end with radial flange portions 32, to which are secured the several spoke members 33, the axial length of the hub being considerable and the spokes secured to the opposite end flanges being arranged to converge together at the periphery of the wheel, so as to afford an extremely rigid construction. As shown herein, the spoke members are made of angle-iron and are conveniently united at their inner ends with the hub by means of end face-plates 34, to which the spoke members are bolted, said face-plates being in turn bolted to the flanges of the hub, as indicated at 35. The spoke members on each side of the wheel are peculiarly arranged, comprising a series of direct or truly radial spokes (designated 33') and pairs of outwardly-converging spokes 33'', which are brought together at their outer ends, but are spaced apart as widely at their inner ends as permitted within the space intervening between the two contiguous direct spokes 33'. The members of each pair of convergent spokes 33'' are rigidly united with each other at their outer ends by means of a side plate 36, which plates afford suitable supports to which the buckets or scoops 37 of the wheel are bolted, as will hereinafter appear. The pairs of convergent spokes at opposite sides of the wheel are arranged laterally opposite to each other, so that the face-plates 36 at opposite sides are in register. The rim member of the wheel is formed by means of a channel-shaped member 38, the side flange members 39 and 39' of which fit between the several side plates 36 and are securely bolted or riveted thereto, as indicated at 40. In order to afford still further rigidity to the wheel structure as a whole, chord-plates 41 are arranged to extend between the side plates 36 at each side of the wheel, the outer edges of said chord-plates being arranged to embrace the side flanges of the channel member 38 and being riveted or bolted thereto at frequent intervals, as shown clearly in the drawings. Said chord-plates are further bolted or riveted to the direct spokes 33', as indicated at 42, serving thereby to rigidly and reliably unite said direct spokes to the rim of the wheel.

The buckets or scoops 37, hereinabove referred to, are of tubular construction and are made of increasing internal diameter from their forward or receiving ends rearwardly throughout their depths, and each scoop is provided at its rear end with a swinging door 43, which is hinged to the outer side or side radially remote from the axis of the wheel upon a transverse axis, as indicated at 44, so that the door swings rearwardly and outwardly in its opening movement. Normally the doors are held in closed position by means of spring-latches 45, which are bolted to the exterior of the buckets at the inner sides thereof, said latches being provided with outturned engaging portions 46, which overlie the margins of the respective doors when the latter are in closed position. As a means of automatically releasing the several doors as they reach the discharge point in the rotation of the excavating-wheel an actuating-rod 47 is connected with each latch and arranged to extend radially inward through suitable guides 48 and 48' to a point adjacent to the hub of the wheel, as best indicated in Figs. 3 and 4. Upon the tilting frame members at each side of the wheel and concentric with the main shaft 28 is arranged a cam-plate 49, which is provided at a point in radial alinement with the discharge point of the wheel with a cam projection or block 50. Said block 50 is provided with an inwardly-curved cam-surface 51, (see detail Fig. 6,) which is adapted to coöperate with cam-lugs 52, formed upon the ends of the several actuating-rods 47, so as to force said actuating-rods inwardly as the wheel rotates, and thereby withdraw the latch from engagement with the door. The cam-block or projection 50 is so arranged as to trip the doors of the several scoops as they reach a point just above the level of the top surface of the main truck-frame, at which time the scoop occupies an approximately vertical position, so that the door falls open by gravity and the contents of the scoop fall freely therefrom. In order that the point of discharge may be varied, the cam-plates 49 have slot-and-bolt connections, as indicated at 49', with supporting-studs 49'' to permit adjustment. The excavated material discharged from the scoops is transferred to a conveyer-belt, and in order to guide or direct the earth outwardly beyond the periphery of the wheel an apron 53 is mounted upon the frame of the wheel just in rear of each scoop and arranged at such an angle thereto that when the scoop is in discharging position said apron will extend downwardly and outwardly at an angle of approximately forty-five degrees from the horizontal. The apron is conveniently mounted upon a bracket-like support 54, secured to the rim of the wheel and chord-plate, as shown clearly in the drawings, and the outer end of said apron is located slightly nearer to the axis of the wheel than the advance or cutting edge of the scoop, so that it does not engage the unexcavated earth in rear of the scoop. The scoops in the preferred construction shown are arranged in two sets at opposite sides of the wheel and are alternated relatively to each other, so as to equalize the cutting or excavating stress upon the wheel. An important feature of improvement consists in so mounting these scoops that they may be adjusted laterally relatively to the rim of the wheel, so as to vary the width of cut of the wheel as a whole. To this end each scoop is mounted upon a bracket member 55, secured to the side face of the wheel, so as to support the scoop at its inner side or that nearest the axis of the wheel, the scoop being adjustably connected with the bracket by means of slot-and-bolt connections, as best indicated at 56 in detail Fig. 5. The scoop is further united with the rim of the wheel by means of a transverse stud-bolt 57, which extends transversely through the laterally-opposite pairs of side plates 36, hereinbefore described, and is adjustable endwise through said plates by means of set-nuts 58, also as best shown in detail Fig. 5. The end of the bolt which engages the scoop is preferably provided with a relatively large and flat head 59, which is suitably riveted to the side of the scoop, as clearly shown. As a minor feature of improvement the outer and advance edge of the scoop is provided with a detachable cutting-shoe 60, which may be renewed from time to time, thereby preserving the life of the scoop as a whole. A further important feature of improvement consists in providing the periphery of the wheel with a series of diggers or plow-fingers 61, which fingers are arranged in groups in advance of each of the several scoops. In order that the fingers may severally act upon different portions of the width of cut covered by the scoop, said fingers are mounted in laterally-extending bracket-like plates 62, suitably bolted to the respective sides of the rim, each plate being of triangular form, as best seen in detail Fig. 7, and the several fingers thereof being arranged at successively greater distances from the central plane of the wheel, as clearly shown.

Describing next the conveyers by means of which the excavated material is discharged to either side of the machine, and referring more particularly to Fig. 9, 63 and 64 designate two pairs of parallel laterally and upwardly extending bracket-like frames mounted upon the respective sides of the main truck-frame and carrying at their outer ends supporting-rollers 65, adapted to support endless belts trained therearound.

66 and 67 designate depending bracket-frames mounted upon the under side of the truck-frame, adjacent to the longitudinal median line thereof, and carrying drive-rollers 68 and 69, respectively, with which the inner ends of the conveyer-belts 70 and 71 are engaged. Preferably, also, and as shown herein, intermediate guide-rollers 72 and 73 are provided, which are conveniently arranged to extend between the lower end portions of the bracket-frames 63 and 64, as shown clearly in said figure.

Referring to Figs. 3 and 9, 74 and 75 designate guide-aprons, which are pivotally mounted upon a suitable transverse shaft 76, having its ends supported in a pair of depending brackets 77, secured to the under side truck-frame members, said aprons being arranged in position to receive the excavated material discharged from the aprons 53, carried by the excavating-wheel. The aprons are mounted so as to be capable of movement independently of each other and are supported in an upwardly and rearwardly inclined position by means of a cross-bar 78, having its ends supported in brackets 79, similar to the bracket 77. The upper ends of the aprons 74 and 75 extend slightly within the path of the aprons 53 and of the diggers or plow-fingers 61, so that they are engaged by the latter and lifted slightly as each passes, thereby maintaining a more or less constant agitation of the aprons, which insures the more effective discharge of the material onto the conveyer-belts. The fact that the said aprons project slightly into the path of the moving aprons 53 also insures that all of the earth will be discharged from the lower aprons to the conveyer-belts.

Next describing the motor mechanism and means whereby the several parts are actuated, and referring more particularly to Figs. 1 and 2, 80 designates as a whole an upright boiler mounted upon the forward portion of the truck-frame, and 81 and 82 designate a pair of similar steam-engines receiving steam from said boiler. The engines 81 and 82 are illustrated in a merely diagrammatic form, since their particular construction forms no part of the present invention. 83 designates a main drive-shaft actuated from the pitman-rods 84 of the two engines in a familiar manner, and upon said main shaft 83 is mounted a spur-gear 85 and a bevel-gear 86, each of which serves to transmit motion to a separate train of gears, now to be described. With the spur-gear 85 is arranged to intermesh a similar gear 86', mounted upon a counter-shaft 87, which carries other gears 88, 89, and 90, all of which are non-rotatably mounted upon said counter-shaft. The gears 89 and 90 are rigidly mounted upon a sleeve 91, which sleeve is splined upon the counter-shaft and is capable of endwise reciprocation thereon through the medium of a hand-lever 92. 93 and 94 designate a pair of gears of different diameter mounted upon a stub-shaft 95 in rear of the counter-shaft 87 and adapted to respectively alternately intermesh with the gears 89 and 90, the object of this arrangement being the usual one of providing for a variable-speed driving connection. Upon the stub-shaft 95 is mounted a sprocket-wheel 96, which serves, by means of a sprocket-belt 97, to transmit motion to a second sprocket-wheel 98, rigidly mounted upon the shaft 19, which constitutes the pivotal support of the tilting frame of the excavating-wheel. Upon the shaft 19, adjacent to the sprocket-wheel 98 and rigidly connected therewith, is mounted another similar sprocket-wheel 100, with which is engaged a second sprocket-belt 101. 102 designates a counter-shaft mounted in suitable bearings upon the tilting frame to extend parallel with the shaft 19, and upon one end of said shaft 102, in vertical alinement with the sprocket 100, is rigidly mounted a sprocket 103, around which is trained the opposite end of the chain belt 101. The shaft 102 is provided at a point coincident with the central plane of the excavating-wheel with a driving-sprocket 104, rigidly mounted thereon, and with this latter sprocket is engaged a drive-belt 105, which extends entirely around the excavating-wheel and is engaged with a series of peripheral sprocket-teeth upon the exterior of the channel-rim 38. With the gear 88 of the counter-shaft 87 is arranged to intermesh a gear 106, journaled in a triangular supporting-frame 107, (see detail Fig. 10,) which frame is pivotally engaged at one of its angles, as indicated at 108, with a counter-shaft 87. The triangular frame 107 carries at its angle most remote from the counter-shaft another gear 109, which is arranged to mesh with the gear 106, so as to be constantly driven by the latter. 110 designates a second stub-shaft journaled to extend parallel with the counter-shaft 87 in rear of and in the present instance below said counter-shaft, being conveniently supported in journal-brackets 111, mounted upon the under side of the bracket-frame. Said stub-shaft 110 carries a spur-gear 112, with which either one of the gears 106 or 109 may be brought into mesh by oscillating the gear-suporting frame 107 about the counter-shaft 87. The angular position of the gear-carrying frame is controlled by means of a hand-lever 113, coöperating with a notched segment 114, suitably secured to the upper side of the truck-frame, as indicated clearly in said detail Fig. 10. Upon the stub-shaft 110 is mounted a sprocket-wheel 115, from which power is transmitted to a similar sprocket 116, mounted upon the rear axle 17 of the truck-wheels through the medium of a sprocket-belt 117.

It will be obvious from the foregoing description that a reversible driving connection is afforded between the counter-shaft 87 and the rear axle, since when the power is transmitted from the gear 88 to gear 106 and from the latter to gear 112 the rotation will be in one direction; but when the power is transmitted from gear 106 to gear 109 and from the latter to gear 112 the drive will be in the reverse direction. The bevel-gear 86 upon the main shaft 83 serves to transmit motion to the conveyer-belts and to a windlass mechanism, as will now be described. To this end a longitudinally-extending shaft 118 is suitably mounted upon the main truck-frame in bearings indicated at 119, 120, and 121 and is provided at its forward end with a bevel-gear 122, arranged to mesh with the gear 86. Upon the opposite or rear end of said shaft 118 are mounted a spur-gear 123 and a sprocket 124. From the sprocket 124 motion is transmitted to the lower or drive roller 72 by means of a sprocket-chain 125, trained around the sprocket 124, and a similar sprocket 126, mounted upon said drive-roller. The spur-gear 123 meshes with a similar spur-gear 127, mounted upon a short counter-shaft 128 and which counter-shaft carries a sprocket 129, similar to the sprocket 124. Motion is transmitted from the sprocket 129 to the drive-roller 73 of the opposite belt by means of a belt 130 and sprocket 131, it being obvious that the transmitted motion imparted to the sprocket 131 through the connections described will be in the reverse direction to that imparted to sprocket 126.

Describing the windlass mechanism referred to, 132 and 133 designate two spur-gears of different pitch diameter mounted upon a sleeve 134, which is splined upon shaft 118 intermediate the length of the latter and is shiftable thereon through the medium of a hand-lever 135.

136 designates a worm-shaft mounted parallel to the shaft 118 in suitable bearings 137 and 138 and having secured thereon a pair of gears 139 and 140, respectively, adapted to intermesh with the gears 132 and 133. The worm-shaft 136 is provided with a worm 141, which is arranged to intermesh with a worm-gear 142, mounted upon a windlass-shaft 143, conveniently arranged in suitable bearings 144 to extend horizontally below the main truck-frame, the periphery of said worm-gear being arranged to project above the truck-frame platform for engagement with the worm-shaft. Upon the windlass-shaft 143, is mounted a windlass-drum 145, which is employed in drawing the excavating-machine forwardly and steadily during the operation of the excavator, a cable to this end being wound upon the drum and trained forwardly to a suitable anchor in advance of the machine in a familiar manner.

Next describing the winch mechanism, whereby the tilting-frame carrying the excavating-wheel is operated, 146 designates a worm-shaft mounted in suitable bearings upon one side of the truck-frame and carrying at one end a worm-wheel 147 and at its opposite end a small winding-drum 148.

149 designates a vertically-disposed worm-shaft mounted in a suitable bearing 150 to operatively engage the worm-wheel 147 and provided at its upper end with a crank-handle 151, whereby it may be rotated.

152 designates a cable which is connected with the forward end of the tilting frame and extends thence downwardly around a guide-pulley 153, suitably mounted upon the side of the truck-frame and from said pulley over and around the winding-drum 148.

The mechanism last described is that by which the tilting frame is manipulated to raise or lower the excavating-wheel manually, such raising and lowering being obviously comparatively slow, but accomplished with an expenditure of slight power. In order that the tilting frame may be raised or lowered by power and more rapidly when desired, I provide at each end of the counter-shaft 87 winding-drums 154, with which may be engaged another cable which extends therefrom upwardly to and is connected with the end of the tilting frame. Inasmuch as the counter-shaft 87 is driven by power, these drums 154 may be used to rapidly raise the excavating-wheel without hand-labor.

The operation of the machine constructed and arranged as shown may be briefly described as follows: Assuming that it be desired to transfer the machine from one place to another, the forward end of the tilting frame is drawn down either by means of the hand-operated winch mechanism operated from the worm-shaft 149 or through the medium of the power-actuated drums 154, thereby raising the excavating-wheel clear off the ground. The traction mechanism, which is driven from the gear 88 on the counter-shaft 87, is then drawn into gear, and the engines being started serve to drive the rear axle and with it the traction-wheels mounted thereon, thus propelling the machine along. Arrived at the space where the excavation is to be made, the counter-shaft 87 is thrown out of gear with the traction mechanism last referred to, the excavating-wheel lowered into operative position, and the gears 89 or 90 thrown into mesh with the driving-gears 93 or 94, depending upon the rate of speed desired, thus actuating the excavating-wheel through the driving connections hereinbefore described. As the excavating-wheel rotates the digger-fingers serve to loosen the earth in advance of the buckets or scoops and the latter scoop up the loosened earth and carry it upwardly to the point of discharge. As each scoop rises to a level slightly above the aprons 74 and 75 its latch is tripped, thus releasing the door and permitting the material to flow by gravity and be guided onto the conveyer-belts 70 and 71. After discharging its contents the scoop in the further rotation of the excavating-wheel is brought first into a horizontal and finally inverted position, which causes its door to swing into closed position by gravity, whereupon the actuating-rod 47 thereof, having by this time passed out of engagement with the cam-block, the latch automatically reëngages the door. During the time that the excavating-wheel is thus being driven conveyer-belts are also being actuated from the bevel-gear 86 and a train of driving-gears connected therewith. The excavating-wheel is gradually lowered as it cuts its way through the earth until the required depth of excavation has been reached, whereupon the windlass mechanism operated from the gears 132 or 133 upon the shaft 118 is thrown into gear, and thereafter the machine as a whole is caused to advance in a gradual but uniform manner, so that the excavating-wheel operates in a continuous manner to form the ditch. Should it happen that in the course of progress the excavating-wheel strikes against an obstruction, such as a stone or snag, the operator immediately stops the machine and, if necessary, backs it away from the obstruction, so that the latter may be removed. In order to accomplish this, the operator simply throws the counter-shaft 87 into gear with the motor mechanism and shifts the gear 109 into position to mesh with the gear 140, thus driving the traction-wheels upon the rear main axle in a direction to propel the machine backward. Before thus backing the machine it will of course be necessary to either loosen or throw out of gear the windlass mechanism, which has theretofore been advancing the machine to its work.

The modified construction shown in Fig. 8 might be readily understood from the drawings alone; but a brief description thereof is as follows: In this instance a plurality of excavating-wheels 29', 29", and 29''' are arranged side by side upon a single main shaft 28', and in order that the several cam-plates 49' may be held immovable relatively to the excavating-wheels said main shaft is secured fixedly within the side members 21' and 22' of the tilting frame and the excavating-wheels are journaled to rotate upon the shaft. The excavating-wheels are substantial duplications of that previously described in other respects, and said wheels are severally driven by means of sprocket-belts engaged with their peripheries in substantially the same manner as in the previous construction, the only difference being that the transverse shaft 102 will in such case be provided with a number of driving-sprockets 103, corresponding to the several excavating-wheels arranged in alinement with the latter. In this instance also the lower aprons 74' are arranged substantially like the corresponding aprons first described, there being simply a larger number corresponding to the complete number of excavating-wheels.

In Fig. 11 I have shown a modification which is of great importance when handling certain kinds of material—as, for example, clayey soils. In said figure, 37' designates the bucket or scoop, which is practically identical with those first described, and 53' designates the apron upon the wheel in rear of the scoop and adapted to receive the excavated material from the latter. The particular feature of novelty in the construction consists in covering the bottom or guiding surface of the apron 53' with a traveling belt 155, which is trained around antifriction guide-rollers 156 and 157 at the upper and lower ends of said apron, respectively, as shown clearly in said figure. By reason of the inclined position of the apron at the time the dirt is discharged thereon the weight of the latter will obviously cause the belt to revolve, so that the dirt will be effectually discharged from the lower end of the belt, even though it be of a decidedly sticky character. This is obviously a feature of great importance in view of the fact that the aprons 53 or 53' remain in a position of steep inclination to the horizontal at comparatively brief intervals, and it is accordingly important that the charge of dirt delivered from the scoop be discharged promptly before the apron has been geared up into a position so nearly horizontal as to prevent the further discharge therefrom. It will be obvious without a specific showing that the same method of facilitating the discharge of the material from the lower aprons 74 may be adopted, if found desirable, in order to avoid difficulty with extremely-sticky materials. This expedient will not be found necessary except in extraordinary cases, because of the fact that said lower aprons 74 75 are agitated, as hereinbefore described.

In Fig. 12 I have shown a modified form of digger which is so constructed as to not only plow up and loosen the material in advance of the scoops, but is at the same time adapted to dress the sides of the ditch so as to leave a smooth vertical wall. In said figure, 62' designates the laterally-extending bracket-frame, which may be identical with that shown in Fig. 7, and 61' designates the modified digger bolted to said bracket-frame. As shown clearly in the drawings, the digger is provided with a lateral or horizontal extension 62'', forming a cutting edge which works in the bottom of the excavation, and a returned or vertical portion 62''', which serves to dress the side wall of the ditch. It will be understood that both the portions 62'' and 62''' are provided with a sharp cutting edge, so as to readily cut through the earth.

It will be understood from the foregoing description that a machine constructed in accordance with my invention is capable of excavating at a relatively rapid rate and without interruption, the several scoops operating much in the manner of a dredge to scoop up and elevate the material and to discharge it upon the conveyer-belts without pausing in their onward movement. The automatic windlass mechanism serves to advance the machine steadily and uniformly, thus presenting a fresh cut to each advancing scoop, while at the same time the operator has full control to raise or lower the excavating-wheel without disarranging or interfering with the driving connections, and thus insuring the excavating of the earth to the precise depth desired.

It will be obvious that the details of construction may be considerably varied without departing from the spirit of the invention and without the exercise of more than ordinary mechanical skill, and I do not, therefore, wish to be limited to the precise details of construction and arrangement shown, except to the extent that they are made the subject of specific claims.

I claim as my invention—

1. In an excavating-machine, the combination with a supporting-frame and motor mechanism mounted thereon, of an excavating-wheel having a series of scoops rigidly mounted upon the periphery thereof, each scoop provided with a rear end door and a guide-apron contiguous thereto, a traveling conveyer mounted at the front side of said excavating-wheel, means for automatically tripping the doors of said scoops as they severally reach a definite point of discharge, and means for directing the excavated material from the scoops to the conveyer.

2. In an excavating-machine, the combination with a supporting-frame, and motor mechanism thereon, of an excavating-wheel having a series of scoops rigidly mounted upon the periphery thereof, each scoop provided with a rear end swinging door, and a latch mechanism normally holding said door in closed position, a traveling conveyer mounted upon said supporting-frame immediately in front of, and below the horizontal center of said excavating-wheel, and arranged to extend laterally therefrom, automatic tripping mechanism operating to release the doors of said scoops as they severally reach a definite point of discharge above said conveyer, and a guide-apron mounted in rear of said scoop to receive the material therefrom and direct it to said conveyer-belt.

3. In an excavating-machine, the combination with a suitable supporting-frame, of an excavating-wheel of rigid construction provided with a series of peripheral scoops arranged with their longitudinal axes perpendicular to the radii of said wheel and located at the periphery thereof; each scoop having an open front end and provided at its rear with a swinging door; means for automatically releasing the several doors of the scoops at a predetermined point in the rotation of the wheel, and a fixed guide-apron mounted in rear of each scoop and adapted to direct the excavated material downwardly and radially outward, for the purpose set forth.

4. In an excavating-machine, the combination with a suitable supporting-frame, of an excavating-wheel of rigid construction provided with a series of peripheral scoops arranged with their longitudinal axes perpendicular to the radii of said wheel and located at the periphery thereof; each scoop having an open front end and provided at its rear with a swinging door; means for automatically releasing the several doors of the scoops at a predetermined point in the rotation of the wheel, a fixed guide-apron mounted in rear of each scoop and adapted to direct the excavated material downwardly and radially outward, a stationary receiving-apron mounted upon the supporting-frame in position to receive the excavated material from the moving aprons, and a conveyer-belt arranged to receive the material from said stationary apron, for the purpose set forth.

5. In an excavating-machine, the combination with a suitable supporting-frame, of an excavating-wheel of rigid construction provided with a series of peripheral scoops arranged with their longitudinal axes perpendicular to the radii of said wheel and located at the periphery thereof; each scoop having an open front end and provided at its rear with a swinging door; means for automatically releasing the several doors of the scoops at a predetermined point in the rotation of the wheel, a fixed guide-apron mounted in rear of each scoop and adapted to direct the excavated material downwardly and radially outward, a stationary receiving-apron mounted upon the supporting-frame in position to receive the excavated material from the moving aprons, and a conveyer-belt arranged to receive the material from said stationary apron, said stationary apron being arranged in upwardly-inclined position with its receiving end projecting within the path of parts upon, moving with, said excavating-wheel and being pivotally supported at its lower end, for the purpose set forth.

6. In an excavating-machine, the combination with a moving excavator-scoop and means for discharging the excavated material therefrom, of a receiving-apron upon which said material falls, and a conveyer-belt operatively mounted to travel over said receiving-apron and free to move toward the discharge end of the apron under the weight of the material carried thereby.

7. In an excavating-machine, the combination with a suitable supporting-frame and driving mechanism, of an excavating-wheel provided with a series of peripheral scoops mounted rigidly thereon, each having a swinging door normally held in closed position, means for automatically releasing said several doors at a predetermined point, an apron mounted in rear of each of the several scoops, and a conveyer-belt mounted to travel over the receiving-surface of each apron, for the purpose set forth.

8. In an excavating-machine, the combination with an excavating-wheel provided with a series of peripheral scoops each having a door, and a latch mechanism for holding said door in closed position, of means for automatically tripping said latch mechanism comprising a cam mounted concentric with the axis of the wheel, and a series of actuating-rods each operatively engaged at one end with the cam, and at its opposite end with the latch mechanism of one of the scoops, whereby said latch mechanisms are severally tripped at a predetermined point in the rotation of the wheel.

9. In an excavating-machine, the combination with an excavating-wheel provided with a series of peripheral scoops each having a door, and a spring-actuated latch mechanism normally holding the door in closed position, means for automatically tripping said latch mechanism comprising a cam mounted concentric with the axis of the wheel, and a series of actuating-rods each operatively engaged at one end with the cam, and at its opposite end with the latch mechanism of one of the scoops, whereby said latch mechanisms are severally tripped at a predetermined point in the rotation of the wheel.

10. In an excavating-machine, the combination with an excavating-wheel provided with a series of peripheral scoops each having a door, and a spring-actuated latch mechanism normally holding the door in closed position, means for automatically tripping said latch mechanism comprising a cam mounted concentric with the axis of the wheel, and provided with a cam projection extending radially inwardly, and a series of actuating-rods each guided to reciprocate endwise and operatively engaging said cam at one end, and at its opposite end connected with one of the spring-latch mechanisms, for the purpose set forth.

11. In an excavating-wheel, the combination with a suitable supporting-frame, of an excavating-wheel of rigid structure and comprising a hub provided at axially-separated points with radial flanges, two series of spoke members respectively connected with said hub-flanges and converging outwardly together at the periphery of the wheel, each lateral series comprising a plurality of pairs of spokes connected with the hub-flange at circumferentially-separated points and arranged to converge together at the periphery of the wheel, substantially as described.

12. In an excavating-wheel, the combination with a suitable supporting-frame, of an excavating-wheel of rigid structure and comprising a hub provided at axially-separated points with radial flanges, two series of spoke members respectively connected with said hub-flanges and converging outwardly together at the periphery of the wheel, each lateral series comprising a plurality of pairs of spokes connected with the hub-flange at circumferentially-separated points and arranged to converge together at the periphery of the wheel, and a series of other truly-radial spokes interposed one between each pair of converging spokes, substantially as described.

13. In an excavating-machine, the combination with a suitable supporting-frame, of an excavating-wheel of rigid structure and comprising a hub provided at axially-separated points with radial flanges, two series of spoke members respectively connected with said hub-flanges and converging outwardly together at the periphery of the wheel, each lateral series comprising a plurality of pairs of spokes connected with the hub-flange at circumferentially-separated points and arranged to converge together at the periphery of the wheel, a series of other truly-radial spokes interposed one between each pair of converging spokes, and a series of peripheral chord-plates extending between adjacent pairs of converging spokes and overlying the interposed truly-radial spokes, substantially as described.

14. In an excavating-machine, the combination with a suitable supporting-frame, of an excavating-wheel of rigid structure and comprising a hub provided at axially-separated points with radial flanges, two series of spoke members respectively connected with said hub-flanges and converging outwardly together at the periphery of the wheel, each lateral series comprising a plurality of pairs of spokes connected with the hub-flange at circumferentially-separated points and arranged to converge together at the periphery of the wheel, a series of other truly-radial spokes interposed one between each pair of converging spokes, a series of peripheral chord-plates extending between adjacent pairs of converging spokes and overlying the interposed truly-radial spokes, and a channel-iron rim extending around the circumference of the wheel and embracing with its lateral flanges the outer ends of the several spokes, substantially as described.

15. In an excavating-machine, the combination with a suitable supporting-frame, of an excavating-wheel of rigid structure and comprising a hub provided at axially-sepa- rated points with radial flanges, two series of spoke members respectively connected with said hub-flanges, each lateral series comprising a plurality of pairs of spokes connected with the hub-flange at circumferentially-separated points and arranged to converge together at the periphery of the wheel, side plates overlying and secured to the converging ends of each pair of spokes, and a rim member interposed between and secured to, said side plates, substantially as described.

16. In an excavating-machine, the combination with a suitable supporting-frame, of an excavating-wheel of rigid structure and comprising a hub provided at axially-separated points with radial flanges, two series of spoke members respectively connected with said hub-flanges, each lateral series comprising a plurality of pairs of spokes connected with the hub-flange at circumferentially-separated points and arranged to converge together at the periphery of the wheel, a series of other truly-radial spokes interposed one between each pair of converging spokes, a rim forming the periphery of the wheel, side plates overlying and secured to the ends of the several pairs of converging spokes and secured also to the sides of said rim, and chord-plates extending between each pair of side plates and secured to the rim and to the intermediate truly-radial spokes, substantially as described.

17. In an excavating-machine, the combination with a suitable supporting-frame, of an excavating-wheel of rigid structure and comprising a hub provided at axially-separated points with radial flanges, two series of spoke members respectively connected with said hub-flanges, each lateral series comprising a plurality of pairs of spokes connected with the hub-flange at circumferentially-separated points and arranged to converge together at the periphery of the wheel, a series of other truly-radial spokes interposed one between each pair of converging spokes, a rim forming the periphery of the wheel, side plates overlying and secured to the ends of the several pairs of converging spokes and secured also to the sides of said rim, chord-plates extending between each pair of side plates and secured to the rim and to the intermediate truly-radial spokes, stud-bolts arranged to extend transversely through laterally opposite pairs of said side plates, and excavating-scoops mounted upon said stud-bolts, substantially as described.

18. In an excavating-machine, the combination with a rigid excavating-wheel, of laterally and oppositely extending brackets upon the respective sides of said wheel, and excavating-scoops mounted upon the respective brackets.

19. In an excavating-machine, the combination with a rigid excavating-wheel, of laterally and oppositely extending brackets upon the respective sides of said wheel, and excavating-scoops adjustably mounted upon the respective brackets so as to be capable of adjustment laterally.

20. In an excavating-machine, the combination with a rigid excavating-wheel, of laterally and oppositely extending brackets upon the respective sides of said wheel, excavating-scoops adjustably mounted upon the respective brackets, and a series of diggers arranged in advance of each scoop; said diggers being arranged in offset relation to each other considered with reference to their paths of movement during the rotation of the wheel.

21. In an excavating-machine, an excavating-wheel of rigid structure provided with a peripheral rim, and a bracket mounted upon said rim to project laterally therefrom, said bracket being provided with a plurality of diggers arranged in offset relation to each other and at successively-greater distances from the central plane of the wheel, substantially as described.

22. In an excavating-machine, the combination with a truck-frame and motor mechanism mounted thereon, of a transverse journal-bearing arranged at the rear end of the truck-frame, a tilting frame pivotally mounted to oscillate on an axis concentric with said transverse journal, an excavating-wheel supported upon said tilting frame, outer transmission-gears mounted concentric with the pivotal axis of the tilting frame, other transmission-gears mounted upon the tilting frame at a point removed from the pivotal axis thereof and parallel with said axis, driving connections from said motor mechanism to one of the transmission-gears concentric with the pivotal axis of the tilting frame, driving connections from said latter gear to one of said gears mounted upon the tilting frame at a point removed from the pivotal axis thereof, and driving connections from said latter gear directly to said excavating-wheel, substantially as described.

23. In an excavating-wheel, the combination with a truck-frame and motor mounted thereon, of a main shaft actuated by said motor, a counter-shaft, driving connections between said main counter-shaft and traction mechanism arranged to act upon one of the axles of said truck, driving connections between said counter-shaft and said traction mechanism, an excavating-wheel supported from, and at the rear of, said truck-frame, and driving connections between said counter-shaft and said excavating-wheel and means for ungearing each of said sets of driving connections, substantially as described.

24. In an excavating-machine, the combination with a truck-frame and a motor mounted upon the front portion of said frame, of a longitudinally-extending drive-shaft operatively connected with said motor, laterally and oppositely extending conveyer-belts mounted at the rear end of said truck-frame, driving connections between said longitudinal driving-shaft and said conveyer-belts, a windlass mechanism and driving connections between said longitudinal drive-shaft and windlass mechanism whereby the conveyer-belts and windlass mechanism are driven simultaneously.

25. In an excavating-machine, the combination with a truck-frame and motor mounted thereon, of a drive-shaft, a traction mechanism arranged to act upon one of the main axles of the truck, and gear connections between said traction mechanism and drive-shaft, said gear connections comprising a gear mounted upon the drive-shaft, an oscillatory and gear-carrying frame mounted to oscillate concentric with the said drive-shaft, two idle gears carried by said frame, one arranged to intermesh with the gear of the drive-shaft, and the other to intermesh with its fellow idle gear, and a driven gear forming a part of the traction mechanism with which either one of said idle gears may be brought into operative engagement at will, substantially as described.

26. In an excavating-machine, the combination with a suitable supporting-frame, of an endless excavator provided with a series of scoops arranged to act successively, a conveyer adapted to receive the excavated material, a movably-mounted guide-apron arranged to direct the excavated material from the excavator to said conveyer, and means for agitating said apron, for the purpose set forth.

27. In an excavating-machine, the combination with a supporting truck-frame, of a tilting frame pivotally supported to overhang the rear end of said truck-frame, a rigidly-constructed excavating-wheel suspended upon said tilting frame, and a transversely-moving conveyer supported from the truck-frame immediately in front of said excavating-wheel, and means for actuating said excavating-wheel and conveyer.

28. In an excavating-machine, the combination with a suitable supporting-frame, of an endless excavator provided with a series of scoops, a conveyer adapted to receive the excavated material, a pivotally-mounted apron supported in an upwardly-inclined position and arranged to direct the excavated material to the conveyer, a part of said apron being arranged to project within the path of a part moving with said excavator, whereby the said apron is intermittently agitated, for the purpose set forth.

29. In an excavating-machine, the combination with a moving excavator-scoop, of a receiving-apron upon which said scoop is arranged to discharge, and a conveyer-belt operatively mounted to travel over the receiving-surface of said apron and free to move toward the discharge end of the apron under the weight of the material discharged thereon.

DAVID W. MILLER.

Witnesses:
ALBERT H. GRAVES,
FREDERICK C. GOODWIN.